United States Patent Office 3,387,062
Patented June 4, 1968

3,387,062
COMPOSITIONS OF POLYVINYL CHLORIDE AND GRAFT POLYMERS OF CHLORINATED BUTYL RUBBER ON POLYVINYL CHLORIDE AND METHOD FOR PREPARATION
Jean-Claude Thomas and Michel Marbach, Lyon, France, assignors to Produits Chimiques Pechiney-Saint-Gobain, Neuilly-sur-Seine, France
No Drawing. Filed Feb. 18, 1965, Ser. No. 433,800
Claims priority, application France, Feb. 25, 1964, 965,053
3 Claims. (Cl. 260—876)

ABSTRACT OF THE DISCLOSURE

The invention is addressed to the preparation of polyvinyl chloride-graft polymer of polyvinyl chloride grafted with chlorinated butyl rubber in which the latter is present in an amount up to 20% by weight of the polymer and in which the composition is prepared by mixing the polyvinyl chloride and graft polymer with working at an elevated temperature to form the materials into a homogeneous system and wherein the polyvinyl chloride and the graft polymer of polyvinyl chloride and polyvinyl butyl rubber are preferably polymerized by bulk polymerization with the polymerization of the graft polymer being carried out at a higher temperature than for the polyvinyl chloride.

---

This invention relates to a new and improved plastic composition and method for the preparation of same and it relates more particularly to a composition formed by the combination of polyvinyl chloride and polyvinyl chloride grafted with chlorinated butyl rubber, which composition is characterized by high impact strength.

Impact strengths of polyvinyl chloride have heretofore been improved by the incorporation of various amounts of polymers or copolymers which have the elasticity properties of rubber, such for example as polybutadiene, nitrile rubbers, and acrylic derivatives. While increase in impact strength is secured, it is subject to excessive and rapid aging and highly sensitive to low temperature conditions. In addition, their flexing temperatures are reduced materially by comparison with polyvinyl chloride thereby seriously to restrict their field of use. Still further, considerable difficulty is experienced in the preparation of homogeneous systems of such combinations of polymers and elastomers.

It is an object of this invention to produce and to provide a method for producing compositions based upon polyvinyl chloride which are not subject to the various disadvantages heretofore described; which have high impact strength, said impact strength having a low rate of aging and very few sensitive to temperatures below 0° C.; which have flexing temperatures that differ but slightly from that of the basic polyvinyl chloride, and which can be produced in a homogeneous state in a simple and efficient manner.

In accordance with the practice of this invention, the new and improved composition consists essentially of the combination of polyvinyl chloride and polyvinyl chloride grafted with chlorinated butyl rubber in which the chlorinated butyl rubber is present in the composition in an amount up to 20% by weight. In the preferred practice of the invention, the amount of chlorinated butyl rubber is selected to be within the range of 4–8% by weight of the composition. Within this range, the optimum relationship between impact strength and flexing temperature is obtainable. The optimum values are not all-inclusive since some improvements in impact strength can be achieved when the amount of chlorinated butyl rubber in the composition is less than 4% by weight.

The preparation of the composition embodying the features of this invention is achieved by mixing polyvinyl chloride and polyvinyl chloride grafted with chlorinated butyl rubber with the two constituents preferably having similar working characteristics, such as determined by viscosity or molecular weight, and wherein such mixing is achieved in conventional transformation machines.

As the polyvinyl chloride component, it is preferred to make use of a powdered polyvinyl chloride obtained by bulk polymerization.

As used herein, the term "polyvinyl chloride grafted with chlorinated butyl rubber" (graft polymer) means a polyvinyl chloride having grafts of chlorinated butyl rubber fixed onto the polymeric chain. Such graft polymers and their process of manufacture have been described in the copending application Ser. No. 413,612, filed Nov. 24, 1964, entitled, "Graft Polymers of Vinyl Chloride and Process for Preparation of Same."

In the practice of this invention, it is preferred to make use of graft polymers having 8–20% by weight of chlorinated butyl rubber. Use can be made of graft polymers having more than 20% by weight chlorinated butyl rubber but such graft polymers are more difficult to prepare. The presence of too high a concentration of chlorinated butyl rubber presents problems in the preparation of the graft polymer by reason of the increase in the viscosity of the medium and incompatibility with the desired conditions for bulk polymerization of the vinyl chloride.

In accordance with a preferred practice of this invention, the graft polymer and the polyvinyl chloride are selected to be of substantially the same or similar average molecular weights such that their working characteristics on the transformation or mixing machines will be more uniform thereby to enable the production of a more homogeneous product. If use is made of graft polymers and polyvinyl chloride differing materially in their average molecular weights, the cohesion of the objects manufactured thereof is insufficient, and undesirable surface characteristics result, particularly with respect to extrusions.

The molecular weight of a pure polyvinyl chloride depends somewhat on the temperature of polymerization, as related to the K index as defined by Fikentscher, Cellulose Chemie 1932, volume 13. At a given temperature of polymerization, a graft polymer is obtained having a molecular weight average which will be higher than that of the polymer obtained with polyvinyl chloride. Thus, in the preferred practice of the invention, it is desirable to make use of a graft polymer formed at a polymerization temperature which is higher than that used in forming the polyvinyl chloride.

The molecular weight of the graft polymer can be determined by measurement of the composed viscosity, said viscosity is obtained by way of the measurement described in the French norm NF T 51–013. Then it becomes a simple matter to interrelate the K index of the polyvinyl chloride and the composed viscosity of the graft polymer for the combination of materials having similar working characteristics or similar molecular weight averages.

The properties desired in the composition and in the products formed thereof can be adjusted by variation in the proportion of chlorinated butyl rubber, by varying the ratio of polyvinyl chloride and the graft polymer and by the adjustment of the ratio of chlorinated butyl rubber in the graft polymer.

Both the polyvinyl chloride and the graft polymer can be made available in the powdered state for easy admixture in desired amounts for combination in conventional mixing or kneading equipment, such as ribbon blenders, paddle mixers or internal mixers of the "Werner" or "Henschel" type.

The compositions obtained by the practice of this invention have, at an equal ratio of chlorinated butyl rubber and polyvinyl chloride, impact strengths and flexing temperatures far superior to the graft polymer per se which is used in the preparation.

The products of the invention have many applications, such as the production of objects of high impact strengths, and particularly products which may be employed in contact with foodstuffs, in which event the chlorinated butyl rubber is formulated of non-toxic materials.

The following examples are given by way of illustration, but not by way of limitation, of the invention:

Example 1.—Preparation of graft polymer

Into a 100-liter stainless steel autoclave, there is introduced 35 kg. of vinyl chloride and 2 kg. of chlorinated butyl rubber (Enjay Butyl HT 10–66). The materials are heated at a temperature of 62° C. for a period of 2 hours in order to dissolve the chlorinated butyl rubber in the vinyl chloride monomer. Azobisisobutyronitrile is introduced as a catalyst in an amount to provide 0.03% by weight when calculated on the weight of the vinyl chloride. A temperature of 62° C. is maintained over a period of 11 hours with the autogenous pressure being 9.5 bars. The vinyl chloride which has not reacted is then degassed and a yield of graft polymers is obtained corresponding to 49.4% with respect to the vinyl chloride used and in which the graft polymer contains 10.3% by weight of chlorinated butyl rubber and has a composed viscosity of 131 when measured in accordance with the procedure in the French norm NF T 15–013.

Preparation of composition

The graft polymer is mixed with vinyl chloride which has been prepared by bulk polymerization and has a K value of 72.6. Mixtures are made in which one mixture comprises equal parts by weight of the graft polymer and the polyvinyl chloride and another mixture comprises 28 parts by weight of the polyvinyl chloride to 72 parts by weight of the graft polymer.

The mixtures are worked at 160° C. for about 10 minutes between rolls, while also incorporating 1.2% by weight of calcium stearate and 1.2% of glycerine when calculated on the weight of the composition. The sheets that are obtained are pressed for 18 minutes at 170° C. into plates from which test specimens are cut out having a length of 60 mm., a width of 15 mm., and a thickness of 4 mm., and having in the middle of one of the large faces, a flat-bottomed U-shaped notch of 0.8 mm. in width and a depth equal to one-third of the thickness of the test specimen. Impact strengths are determined on 20 specimens for each composition with use being made of a Charpy impact machine, in which the test specimens are set on edge on supports with the distance between supports being 40 mm. The heat distortion point is also determined in which the heat distortion point is the temperature at which the modulus of rigidity equals 31.5 kg./mm.$^2$ for a parallelepiped test specimen having the dimensions of 100 mm. x 10 mm. x 4 mm., and submitted to an applied torque in a plane perpendicular to its largest face in an apparatus known industrially as "Clash and Berg."

The results of the tests are summarized in the following table which includes comparisons made with specimens formed of the polyvinyl chloride and of the graft polymer used for the preparation of the compositions:

TABLE I

| PVC, percent by weight | Graft polymer, percent by weight | Chlorinated butyl rubber, percent by weight of the composition | Impact Strength at 20° C., kg. cm./cm.$^3$ | Heat distortion point, ° C. |
| --- | --- | --- | --- | --- |
| 100 | 0 | 0 | 0.80 | 77 |
| 0 | 100 | 10.3 | ($^1$) | 63 |
| 50 | 50 | 5.15 | 2.6 | 72 |
| 28 | 72 | 7.5 | ($^2$) | 68 |

$^1$ 5 breaking/20 test specimens.
$^2$ 0 breaking/20 test specimens.

This table illustrates the improvements secured in impact strengths for the compositions embodying the features of this invention.

The test specimens obtained with the composition containing 50% polyvinyl chloride and 50% graft polymer were also submitted to accelerated X-ray aging in the apparatus referred to industrially as the "Atlas Weather O'Meter." After 10 hours of treatment, the impact strength is calculated as 2.3 kg. cm./cm.$^3$; after 50 hours, 2 kg. cm./cm.$^3$, and after 150 hours 1.8 kg. cm./cm.$^3$.

Example 2

In a 500-liter stainless steel horizontal autoclave, a graft polymer is prepared by the introduction of 200 kg. of vinyl chloride and 9 kg. of chlorinated butyl rubber, and the materials are heated for 2 hours at 68° C. with agitation to dissolve the chlorinated butyl rubber in the monomer. Introduction is then made of azodiisobutyronitrile as a catalyst in an amount corresponding to 0.018% of the vinyl chloride. The reaction mixture is maintained at a temperature of 68° C. for 13 hours at an autogenous pressure of 11.5 bars. After degassing the unreacted vinyl chloride, a yield of 50.1% is obtained with respect to the weight of the vinyl chloride. The graft polymer, containing 8.2% by weight chlorinated butyl rubber, has a composed viscosity of 103.

The graft polymer of this example is mixed with polyvinyl chloride having a K value of 64.2 when polymerized in bulk. The impact strengths and flexing temperature are determined of the specimens prepared in accordance with Example 1. The results of these tests are summarized in the following table which also includes values secured for specimens formed of the polyvinyl chloride alone and of the graft polymer alone used for the preparation of the composition.

TABLE II

| PVC, percent by weight | Graft polymer, percent by weight | Chlorinated butyl rubber, percent by weight of the composition | Impact Strength at 20° C., kg. cm./cm.$^3$ | Heat distortion point, ° C. |
| --- | --- | --- | --- | --- |
| 100 | 0 | 0 | 0.65 | 77 |
| 0 | 100 | 8.2 | 2.7 | 65 |
| 51.2 | 48.8 | 4 | 3.3 | 73 |

Example 3

In the same apparatus as in Example 2, a graft polymer is prepared by introduction of 20 kg. of vinyl chloride and 16 kg. of chlorinated butyl rubber. The materials are heated for 3 hours at 68° C. with agitation in order to dissolve the chlorinated butyl rubber in the monomer. Azobisisobutyronitrile is introduced as a catalyst in an amount of 0.024% by weight of the vinyl chloride. The reaction medium is maintained for 12 hours at 68° C., that is to say at an autogenous pressure of 11.5 bars. After degassing the unreacted vinyl chloride, a graft polymer is obtained in a yield of 46.8% based upon the weight of the vinyl chloride and in which the graft polymer has 14.6% by weight of chlorinated butyl rubber and a composed viscosity of 112.

Mixtures of the graft polymer are made with polyvinyl chloride corresponding to a K value of 67.3 prepared by bulk polymerization. The mixtures are made in the ratios set forth in the following table and specimens are produced in accordance with the procedure in Example 1, and the test specimens are evaluated for impact strength and their flexing temperature. The comparative results of the tests are set forth in the following table:

TABLE III

| PVC, percent by weight | Graft polymer, percent by weight | Chlorinated butyl rubber, percent by weight of the composition | Impact Strength at 20° C., kg. cm./cm.$^3$ | Heat distortion point, ° C. |
|---|---|---|---|---|
| 100 | 0 | 0 | 0.70 | 77 |
| 0 | 100 | 14.6 | (1) | 42 |
| 72.6 | 27.4 | 4 | 3 | 73 |
| 59 | 41 | 6 | 4.3 | 70 |

[1] 0 breaking/20.

Example 4

Polyvinyl chloride having a K value of 71.5, obtained by bulk polymerization, and a graft polymer polymerized at 67° C. and containing 12.1% by weight of chlorinated butyl rubber and having a composed viscosity of 126 are combined by admixture in the ratio set forth below.

The results of impact strength and heat distortion secured by evaluation of test samples secured by the procedure of Example 1 are summarized in the following table:

TABLE IV

| PVC, percent by weight | Graft polymer, percent by weight | Chlorinated butyl rubber, percent by weight of the composition | Impact Strength at 20° C., kg. cm./cm.$^3$ | Heat distortion point, ° C. |
|---|---|---|---|---|
| 100 | 0 | 0 | 0.80 | 77 |
| 83.5 | 16.5 | 2 | 0.95 | 76 |
| 67 | 33 | 4 | 1.8 | 72 |
| 50.5 | 49.5 | 6 | 3 | 71 |
| 33.9 | 66.1 | 8 | 3.6 | 68 |
| 17.4 | 82.6 | 10 | 3.2 | 66 |
| 0 | 100 | 12.1 | 2.8 | 62 |

From the values set forth in the above, it will be seen that the highest impact strength coupled with satisfactory heat distortion points are obtained with compositions containing chlorinated butyl rubber within the range of 4–8% by weight.

Example 5

Comparison is made by way of impact strengths and heat distortion points of samples prepared in accordance with the teachings of Example 1, wherein the samples are prepared of a graft polymer and a mixture of polyvinyl chloride (K value of 64) and a graft polymer in which the amount of chlorinated butyl rubber is substantially the same in both of the test compositions. The results are summarized in the following table:

TABLE V

| PVC, percent by weight | Graft polymer, percent by weight | Chlorinated butyl rubber, percent by weight of the composition | Impact Strength at 20° C., kg. cm./cm.$^3$ | Heat distortion point, ° C. |
|---|---|---|---|---|
| 0 | 100 | 6.1 | 2.3 | 67 |
| 42 | 58 | 6.0 | 3.7 | 71 |

It will be noticed from the above that the compositions embodying the practice of this invention have an increase in impact strength of more than 60% by comparison with the graft polymer alone which contains the same quantity of chlorinated butyl rubber. The flexing temperature is also higher.

It will be apparent from the foregoing that we have provided a new and improved composition formulated of a polyvinyl chloride base in which the composition is characterized by high impact strengths, said impact strengths having a low rate of aging and very few sensitive to low temperatures, and in which such materials do not differ materially from the original heat distortion points, It will be understood that changes may be made in the details of formulation and manufacture without departing from the spirit of the invention, especially as defined in the following claims.

We claim:

1. A composition consisting essentially of polyvinyl chloride and a graft polymer of polyvinyl chloride grafted with 8–20% by weight of chlorinated butyl rubber in which the chlorinated butyl rubber is present in the composition in an amount up to 20% by weight.

2. A composition as claimed in claim 1 in which the chlorinated butyl rubber is present in the composition in an amount within the range of 4–8% by weight.

3. A composition as claimed in claim 1 in which the graft polymer and the polyvinyl chloride have similar average molecular weights.

References Cited

UNITED STATES PATENTS 3,144,426 8/1964 Burke et al. _____ 260—876
3,268,623 8/1966 Beer _____ 260—876

MURRAY TILLMAN, *Primary Examiner.*

GEORGE LESMES, *Examiner.*

T. G. FIELD, C. J. SECCURO, *Assistant Examiners.*